US009697402B1

(12) United States Patent
Khor et al.

(10) Patent No.: US 9,697,402 B1
(45) Date of Patent: Jul. 4, 2017

(54) SYSTEM AND METHOD FOR INTEGRATED CIRCUIT HANDLING AND TRACKING

(71) Applicant: Xilinx, Inc., San Jose, CA (US)

(72) Inventors: Tze Hern Khor, Singapore (SG); Wei Yee Jocelyn Teo, Singapore (SG); Hung Wei Ng, Singapore (SG); Chen Huat Ng, Singapore (SG); Hsao Hsien Yang, Singapore (SG); Mini Padmanabhan, Singapore (SG)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/359,337

(22) Filed: Nov. 22, 2016

(51) Int. Cl.
G06F 19/00 (2011.01)
G06K 7/10 (2006.01)
G06K 19/077 (2006.01)
G06K 19/06 (2006.01)
G06F 17/30 (2006.01)

(52) U.S. Cl.
CPC ... G06K 7/10861 (2013.01); G06K 19/06037 (2013.01); G06K 19/077 (2013.01); G06F 17/30879 (2013.01)

(58) Field of Classification Search
USPC .................. 235/375, 385; 700/116, 121, 224
See application file for complete search history.

(56) References Cited

U.S. PATENT DOCUMENTS

| 4,454,413 | A | * | 6/1984 | Morton, Jr. | ........ | G01R 31/2851 |
| | | | | | | 235/375 |
| 5,118,369 | A | * | 6/1992 | Shamir | ................ | G09F 3/0297 |
| | | | | | | 156/64 |
| 6,367,042 | B1 | * | 4/2002 | Phan | ................ | G01R 31/3187 |
| | | | | | | 714/733 |

* cited by examiner

Primary Examiner — Daniel Hess
(74) Attorney, Agent, or Firm — Robert M. Brush

(57) ABSTRACT

An example method of tracking information for integrated circuits (ICs) that are handled by a plurality of tools during manufacture includes: marking each of IC with a barcode after the ICs have been packaged; performing, at a first tool of the plurality of tools, one or more electrical tests of the ICs and storing electrical characteristics of each IC in association with the barcode of each IC in a database; querying the database with a specification to obtain a set of barcodes for candidate ICs having electrical characteristics that match the specification; scanning, at a second tool of the plurality of tools, the barcode of each of the ICs to select a plurality of ICs each having a respective barcode in the set of barcodes; and segregating the plurality of ICs from the ICs.

20 Claims, 5 Drawing Sheets

| Serial No. 302 | Electrical Characteristics 304 | Genealogy 306 | Batch Identifier 308 | Other data 310 |

SYSTEM AND METHOD FOR INTEGRATED CIRCUIT HANDLING AND TRACKING

TECHNICAL FIELD

Examples of the present disclosure generally relate to a semiconductor device manufacturing system, in particular, to a system and method for integrated circuit (IC) handling and tracking.

BACKGROUND

Semiconductor device fabrication is a complex process that involves many manufacturing and testing steps. Typically, semiconductor devices are form on wafers, which are then separated and packaged to form multiple integrated circuit (IC) devices. The IC devices are segregated based on electrical test results and allocated to a specific bin based on speed and temperature performance. Tracking of the IC devices within the manufacturing flow is restricted to lot-level (e.g. batch-level) tracking.

SUMMARY

Techniques for integrated circuit handling and tracking are described. In an example, a method of tracking information for integrated circuits (ICs) that are handled by a plurality of tools during manufacture includes: marking each of IC with a barcode after the ICs have been packaged; performing, at a first tool of the plurality of tools, one or more electrical tests of the ICs and storing electrical characteristics of each IC in association with the barcode of each IC in a database; querying the database with a specification to obtain a set of barcodes for candidate ICs having electrical characteristics that match the specification; scanning, at a second tool of the plurality of tools, the barcode of each of the ICs to select a plurality of ICs each having a respective barcode in the set of barcodes; and segregating the plurality of ICs from the ICs.

In another example, a system for tracking information for integrated circuits (ICs) that are handled by a plurality of tools during manufacture includes: a first tool configured to mark each of IC with a barcode after the ICs have been packaged; a second tool configured to perform one or more electrical tests of the ICs and storing electrical characteristics of each IC in association with the barcode of each IC in a database; and at least one additional tool configured to: query the database with a specification to obtain a set of barcodes for candidate ICs having electrical characteristics that match the specification; scan the barcode of each of the ICs to select a plurality of ICs each having a respective barcode in the set of barcodes; and segregate the plurality of ICs from the ICs.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
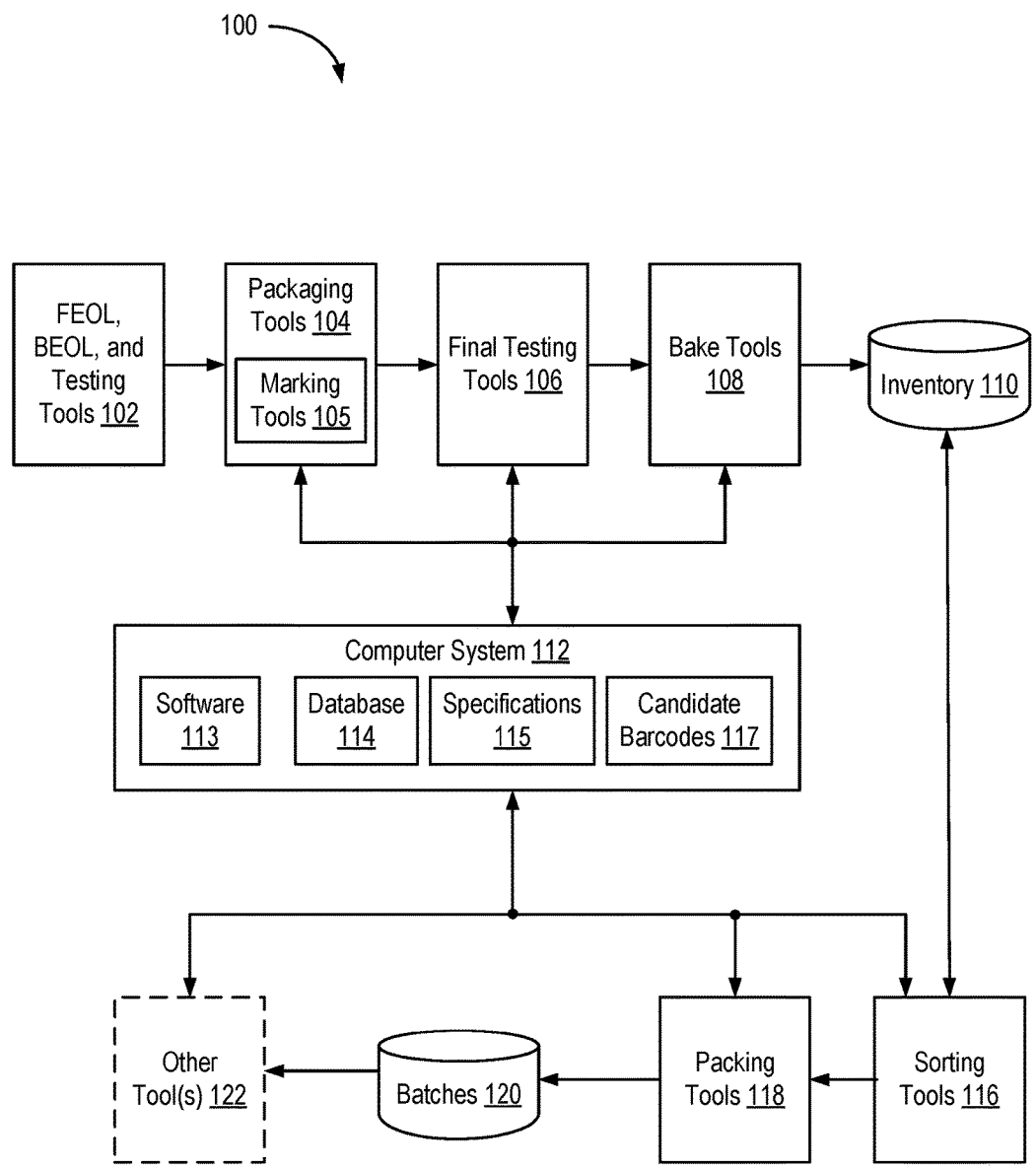
FIG. 1 is a block diagram depicting an integrated circuit (IC) manufacturing and handling system according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

FIG. 1 is a block diagram depicting an integrated circuit (IC) manufacturing and handling system 100 according to an example. The system 100 includes front-end of line (FEOL), back-end of line (BEOL), and testing tools 102, packaging tools 104, final testing tools 106, bake tools 108, a computer system 112, sorting tools 116, and packing tools 118. The FEOL, BEOL, and testing tools 102 are configured to manufacture a plurality of IC dies on wafers and perform testing of the IC dies on the wafers. The FEOL, BEOL, and testing tools 102 can separate the IC dies from the wafers (referred to as die singulation). Alternatively, the packaging tools 104 can perform die singulation.

The packaging tools 104 are configured to package the IC dies to form packaged ICs (generally referred to as ICs). The packaging tools 104 include marking tools 105 that are configured to physically mark the packages of the ICs. In an example, the marking tools 105 are configured to generate a serial number for each IC and to encode the serial number into a barcode. The marking tools 105 are configured to physically mark the package of each IC with a barcode that encodes its serial number. Each barcode is unique for each IC. In an example, the barcode is a two-dimensional (2D) barcode. The marking tools 105 cooperate with the computer system 112 to store the serial numbers of the ICs in a database 114.

The final testing tools 106 are configured to perform one or more electrical tests on each IC. The final testing tools 106 generate electrical characteristics for each IC in response to the electrical testing. The electrical characteristics can include various attributes, such as a speed rating, a temperature rating, and the like. The final testing tools 106 cooperate with the computer system 112 to store the electrical characteristics for each IC in the database 114 in association with the serial number of each IC.

The bake tools 108 are configured to heat the ICs to remove moisture therefrom. The ICs are packed (e.g., into bags) and added to an inventory 110. Notably, it is not necessary to separate the ICs into physical bins within the inventory 110 based on speed/temperature ratings. Since each IC has a unique barcode encoding its serial number, the electrical characteristics of each IC can be obtained from the database 114 by scanning the barcode. This allows for ICs having different speed/temperature ratings to be mixed within the inventory 110. This simplifies inventory management and obviates the need to provide a sorter after the bake tools 108 and to maintain separate physical bins for different speed/temperature ratings.

Use of the barcode also obviates the need to physically mark the package of each IC with an indication of a rating (e.g., speed/temperature rating). However, this requires that the ICs be marked after processing by the final testing tools 106. This also publishes the rating of the IC on the package, where it can be viewed by customers. Customers may order ICs having a particular rating, but the manufacture may decide to ship higher rated ICs for the purpose of inventory management. However, this can cause confusion at the customer despite the fact that the ICs satisfy their rating requirements. In the examples, the ICs are marked with barcodes. It is not necessary to mark the ICs with rating information since the electrical characteristics are maintained in the database 114. The manufacturer can provide ICs having a higher rating than required by the customer for the purpose of inventory management without causing customer confusion.

The computer system 112 can include one or more computers each including conventional components of a computing device, such as one or more processors, system memory, storage, network interfaces, input/output (IO) devices, and the like. The computer system 112 can be coupled to various tools in the system 100, such as the packaging tools 104 (including the marking tools 105), the final testing tools 106, the bake tools 108, the sorting tools 116, and the packaging tools 118. The computer system 112 can receive data from the tools (e.g., to store in the database 114). The computer system 112 can provide data to the tools (e.g., specifications 115). The computer system 112 can also provide instructions to the tools for controlling the tools. The computer system 112 performs its various functions described herein through execution of software 113.

In an example, the specifications 115 are requirements that ICs must satisfy for a particular batch of ICs. For example, a customer can order a particular batch of ICs each of which must satisfy some requirements (e.g., each having a particular speed/temperature rating). In an example, the computer system 112 can query the database 114 to generate a list of barcodes for candidate ICs that have electrical characteristics that match a given specification ("candidate barcodes 117"). Thus, the computer system 112 can generate a set of candidate barcodes 117 for each set of specifications 115. The computer system 112 can provide the candidate barcodes 117 to the sorting tools 116. In another example, the function of querying can be performed by another tool, such as by the sorting tools 116. In such an example, the computer system 112 can provide the specifications 115 to the sorting tools 116, which in turn can generate the candidate barcodes 117 by cooperating with the computer system 112 to query the database 114.

The sorting tools 116 receive ICs from the inventory 110, scan the barcodes from the packages of the ICs, and identify ICs having barcodes that are in a given set of candidate barcodes 117. The sorting tools 116 can select an IC for the batch if its barcode is on the list and can inform the computer system 112 of the selection. For example, the specifications 115 can be associated with a batch identifier (ID), which can be stored in the database in association with ICs selected for the batch. The sorting tools 116 can supply the selected ICs to the packing tools 118. The sorting tools 116 can return unselected ICs to the inventory 110.

The packing tools 118 are configured to segregate the selected ICs into batches based on batch ID. The packing tools 118 can scan the barcodes on the ICs and cooperate with the computer system 112 to obtain the batch IDs from the database 114. The packing tools 118 supply batches of ICs 120, which can then be shipped to customers or subject to further handling by one or more additional tools 122.

The system 100 is capable of several variations from the example described above. In general, the system 100 includes one or more marking tools configured to physically mark IC packages with barcodes that encode unique serial numbers. The system includes a computer system configured to manage a database that stores various information in association with the unique serial numbers. The computer system 112 is coupled to various tools downstream from the marking tools, each of which can include a scanner for scanning the barcodes on the IC packages. The downstream tools can scan the barcodes, obtain serial numbers, and query the database 114 to obtain information, such as electrical characteristics, batch IDs, and the like.

The barcodes provide for part-level traceability and identification of ICs. The system 100 allows electrical characteristics of each IC to be matched with internal specifications or customer requirements and identifies ICs for segregation into batches. This selection and segregation process allows identification of batches of ICs to be allocated for the next internal supply chain process or for customer shipment. Device traceability is enabled, as all barcodes are associated with a batch ID, which in turn can be linked to a customer, sales order, or the like. The benefits of the system include: flexibility in inventory management to meet internal or customer requirements; fast identification of material, impacted tools, and affected customers in the event of excursions; enables fewer pieces of marked information on the IC packages; allows greater efficiencies in manufacturing flow; and allows for part-level traceability.

Figure 2A:
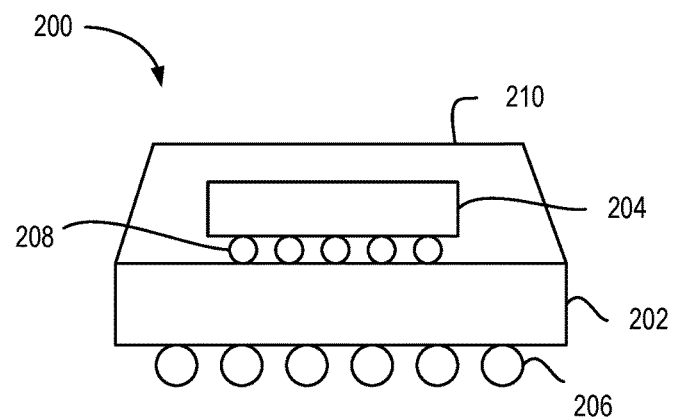
FIG. 2A is a cross-section of an IC according to an example.
Figure 2B:
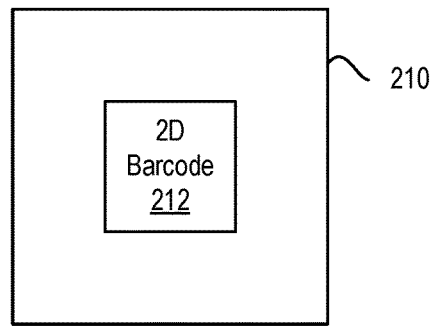
FIG. 2B shows a top view of a lid of an IC according to an example.

FIG. 2A is a cross-section of an IC 200 according to an example. The IC 200 generally includes a package substrate 202, an IC die 204, and a lid 210. The IC die 204 is electrically and mechanically mounted to the package substrate 202 by contacts 208 (e.g., microbumps). The package substrate 202 includes contacts 206 (e.g., solder balls). The lid 210 encapsulates the IC die 204. FIG. 2B shows a top view of the lid 210 of the IC 200 according to an example. The lid 210 includes a 2D barcode 212 physically marked thereon. Although a 2D barcode is described in the example, in general, the lid 210 can include any type of barcode marking. The barcode 212 encodes a serial number associated with the IC 200.

Figure 3:
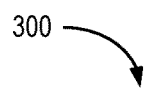
FIG. 3 is a block diagram depicting the format of an entry in a database according to an example.

FIG. 3 is a block diagram depicting the format of an entry 300 in the database 114 according to an example. The entry 300 includes a serial number 302, electrical characteristics 304, genealogy 306, batch identifier 308, and other data 310. The serial number 302 is unique among the ICs and is encoded in the barcodes thereon. The electrical characteristics 304 can be obtained from testing tools. The genealogy 306 can store data related to which tools handled each IC. This allows a given IC to be traced through the system 100. The batch identifier 308 is used to identify a group of ICs in which a given IC is a member. The batch ID can identify a customer, purchase order, or the like. Other data 310 can include various data associated with a given IC.

Figure 4:
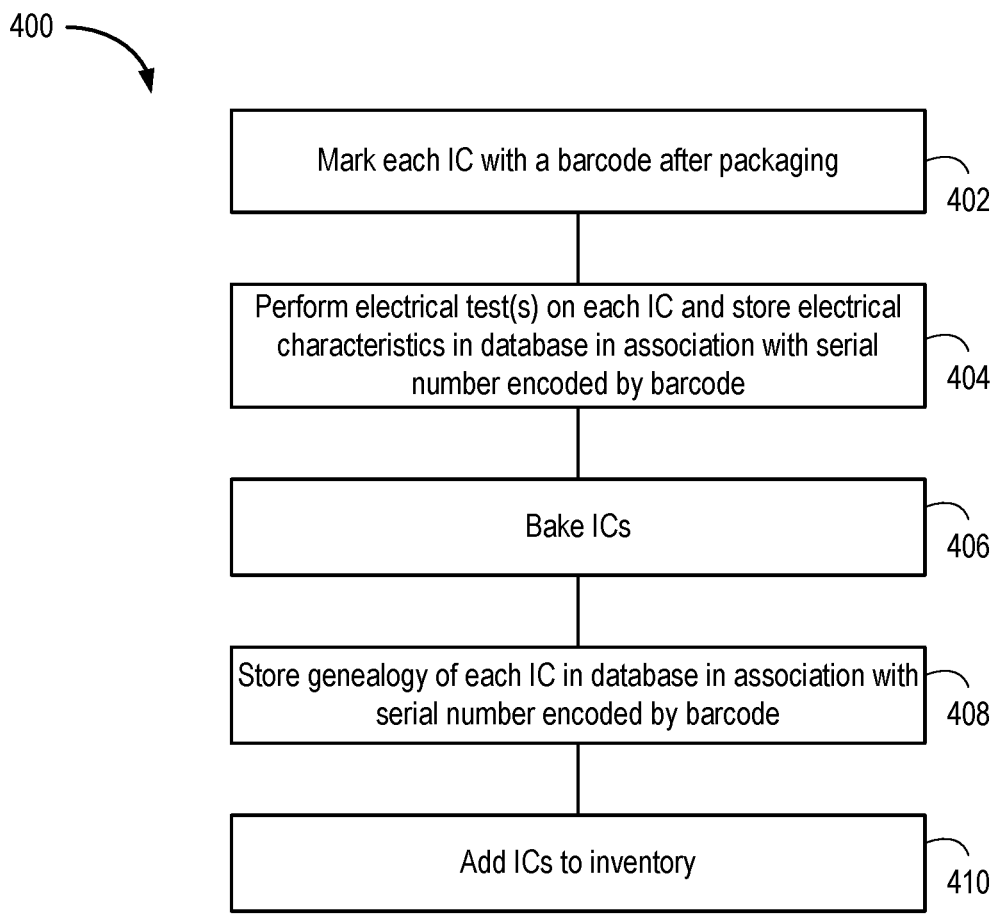
FIG. 4 is a flow diagram depicting a method of handling ICs according to an example.

FIG. 4 is a flow diagram depicting a method 400 of handling ICs according to an example. The method 400 begins at step 402, where the marking tools 105 mark each IC with a barcode after packaging. Each barcode encodes a unique serial number for a given IC. At step 404, the final testing tools 106 perform electrical test(s) on each IC and stores electrical characteristics in the database 114 in association with the serial number encoded by the barcode. At step 405, the bake tools 108 heats the ICs to remove moisture. At step 408, any of the handling tools can cooperate with the computer system 112 to store genealogy information for each IC in the database 114 in association with the serial number encoded by the barcode. At step 410, the ICs are added to the inventory 110.

Figure 5:
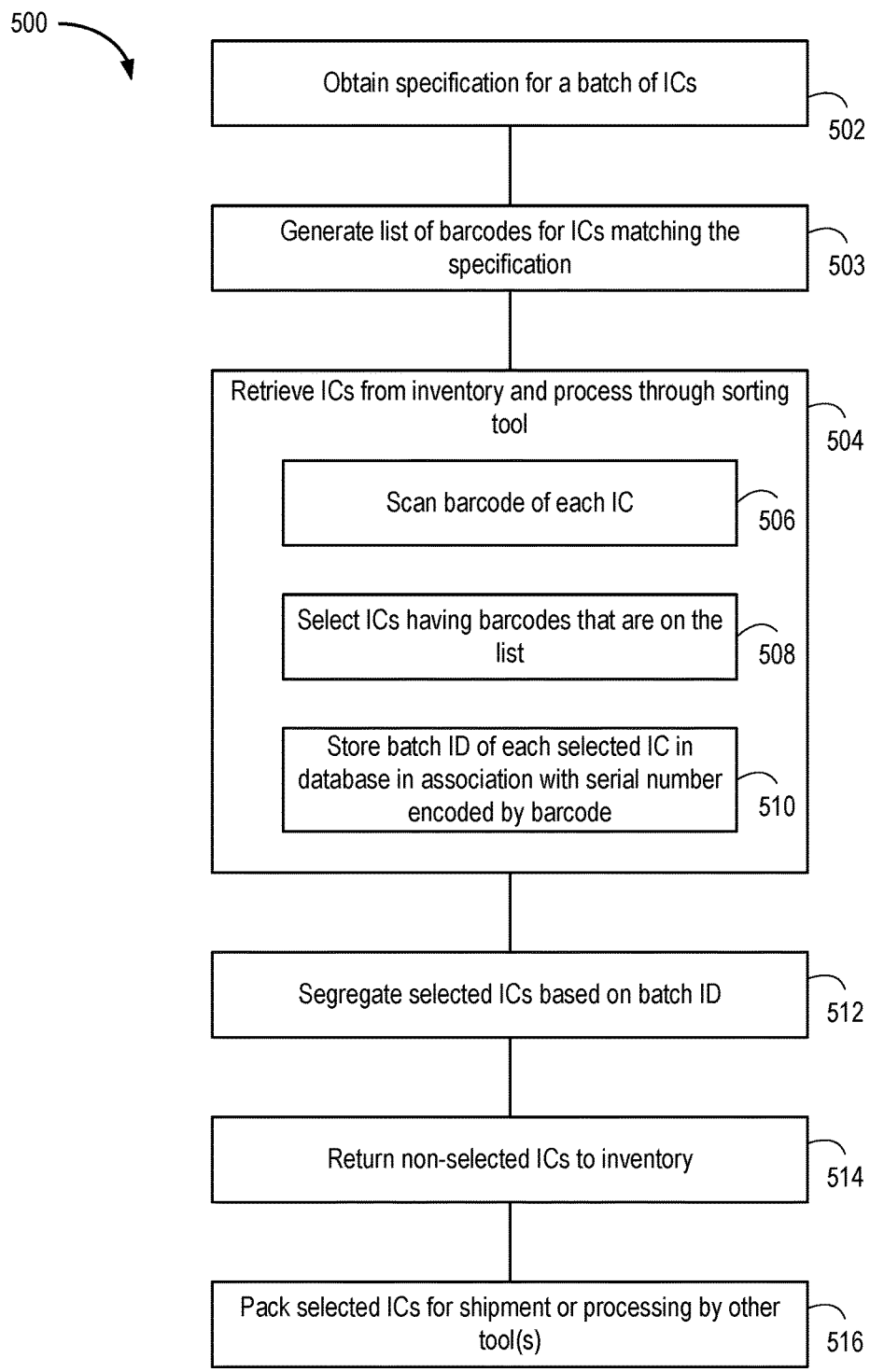
FIG. 5 is a flow diagram depicting a method of handling ICs according to an example.

FIG. 5 is a flow diagram depicting a method 500 of handling ICs according to an example. The method 500 begins at step 502, where the sorting tools 116 obtain a specification for a batch of ICs. At step 503, the sorting tools 116 generate a list of barcodes for candidate ICs having electrical characteristics that match the specification. For example, the sorting tools can query the database 114 with the required electrical characteristics to obtain serial numbers and barcodes of candidate ICs matching the specification. In another example, step 502 and/or step 503 can be performed by a different tool, such as by the computer system 112. In such case, other tool (e.g., the computer system 112) provides the list of barcodes for ICs matching the specification to the sorting tools 116.

At step 504, the sorting tools 116 receive ICs from the inventory 110 and process the ICs. For example, at step 506, the sorting tools 116 scan the barcode of each IC. At step 508, the sorting tools 116 select ICs having barcodes that are on the list of barcodes. At step 510, the sorting tools 116 can store a batch ID of each selected IC in the database 114 in association with the serial number of each IC. There can be more barcodes on the list than required for the batch of ICs. The sorting tools 116 can complete the sorting process once enough ICs have been identified for the batch of ICs.

At step 512, the packing tools 118 segregate the selected ICs based on the batch ID. The packing tools 118 can scan the barcodes of the ICs and query the database 114 to obtain the batch ID. At step 514, the sorting tools 116 can return the non-selected ICs to the inventory 110. At step 516, the packing tools 118 can pack the selected ICs for shipment or processing by other tools.

Figure 6:
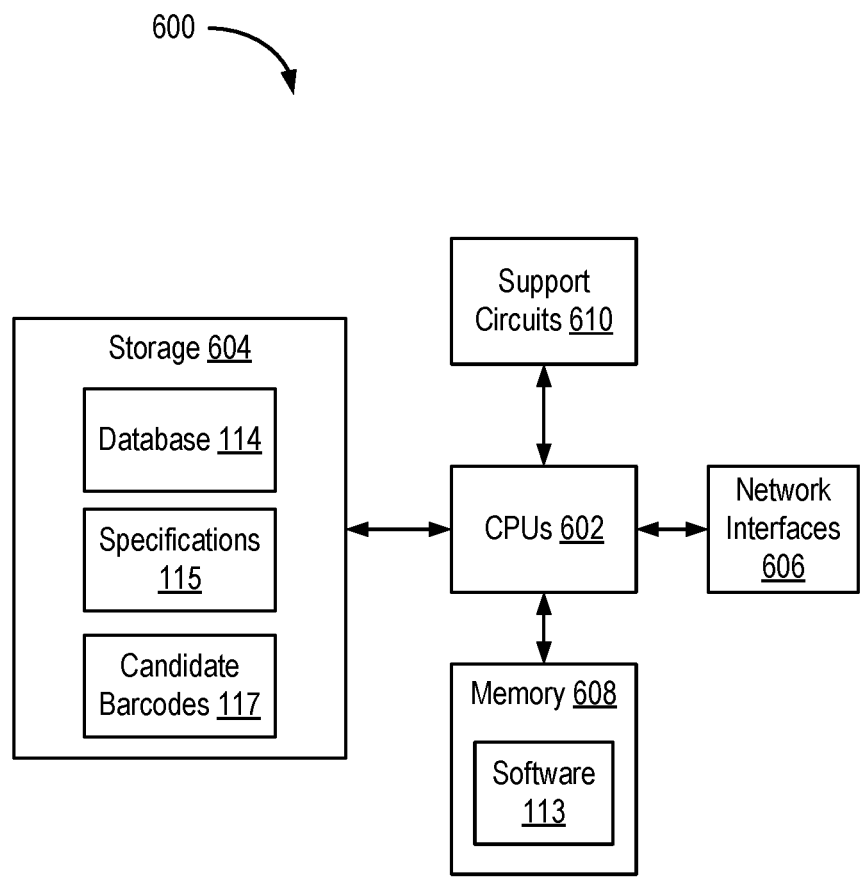
FIG. 6 is a block diagram depicting an example of a computer system according to an example.

FIG. 6 is a block diagram depicting an example of a computer system 600 according to an example. The computer system 600 can be used to implement the computer system 112 shown in FIG. 1. The computer system 600 include conventional components of a computing device, such as one or more processors (CPUs) 602, system memory 608, storage system 604, and one or more network interfaces 606. The CPUs 602 are configured to execute instructions, for example, executable instructions that perform one or more operations described herein and may be stored in the system memory 608 and in local storage. The system memory 608 is a device data to be stored and retrieved. The system memory 608 may include, for example, one or more random access memory (RAM) modules. The network interface(s) 606 enable the computer 600 to communicate with another device via a communication medium, such as a network (not shown). Each network interface 606 may be one or more network adapters, also referred to as a Network Interface Card (NIC). The storage system 604 represents local storage devices (e.g., one or more hard disks, flash memory modules, solid state disks, and optical disks) and/or a storage interface that enables the computer 600 to communicate with one or more network data storage systems. Examples of a storage interface are a host bus adapter (HBA) that couples the computer 600 to one or more storage arrays, such as a storage area network (SAN) or a network-attached storage (NAS), as well as other network data storage systems. The storage 604 can store the database 114, the specifications 115, and the candidate barcodes 117. At any given time, all or a portion of the database 114, the specifications 115, and the candidate barcodes 117 can be stored in the memory 608.

Techniques for integrated circuit handling and tracking have been described. A barcode is physically marked on each IC and used for part-level traceability and identification. Each barcode can represent a unique serial number that identifies an IC tracked in the system. Various tools can read the barcodes from the ICs while handling the ICs. The system allows electrical characteristics of every IC to be matched with internal specifications or customer requirements. The system identifies selected ICs for segregation from the rest of the ICs through scanning of the barcodes. The selection and segregation process allows identification of a batch of ICs to be allocated to the next internal supply chain process or for customer shipment. IC traceability is enabled by associating the barcodes of the ICs in a batch with a given customer or sales order. The benefits of the system include: 1) flexibility in inventory management to meeting internal or customer requirements; 2) fast identification of material, impacted tool, or affected customer in the event of excursion; 3) enables less information to be marked on the IC package; and 4) allows for part-level traceability.

While the foregoing is directed to specific examples, other and further examples may be devised without departing from the basic scope thereof, and the scope thereof is determined by the claims that follow.

What is claimed is:

1. A method of tracking information for integrated circuits (ICs) that are handled by a plurality of tools during manufacture, comprising:
    marking each of the ICs with a barcode;
    performing, at a first tool of the plurality of tools, one or more electrical tests of the ICs and storing electrical characteristics of each IC in association with the barcode of each IC in a database;
    querying the database with a specification to obtain a set of barcodes for candidate ICs having electrical characteristics that match the specification;
    scanning, at a second tool of the plurality of tools, the barcode of each of the ICs to select a plurality of ICs each having a respective barcode in the set of barcodes; and
    segregating the plurality of ICs from the ICs.

2. The method of claim 1, wherein the barcode of each IC is a 2D barcode that uniquely identifies each IC.

3. The method of claim 1, wherein the specification is associated with an entity, and wherein the method further comprises:
    storing an identifier for the entity in the database in association with the barcode of each of the plurality of ICs.

4. The method of claim 1, further comprising:
storing an identifier for each of the plurality of tools that handled each of the ICs in association with the barcode of each of the ICs.

5. The method of claim 1, wherein the step of querying is performed by the second tool.

6. The method of claim 5, wherein the step of segregating is performed by the second tool.

7. The method of claim 5, wherein the step of segregating is performed by a third tool of the plurality of tools.

8. The method of claim 1, wherein the step of querying is performed by a third tool of the plurality of tools.

9. The method of claim 1, further comprising:
handling the plurality of ICs after segregation as a batch by one or more tools.

10. The method of claim 1, wherein the specification comprises at least one of a speed requirement and a temperature requirement.

11. A system for tracking information for integrated circuits (ICs) that are handled by a plurality of tools during manufacture, comprising:
a first tool configured to mark each of IC with a barcode after the ICs have been packaged;
a second tool configured to perform one or more electrical tests of the ICs and storing electrical characteristics of each IC in association with the barcode of each IC in a database; and
at least one additional tool configured to:
query the database with a specification to obtain a set of barcodes for candidate ICs having electrical characteristics that match the specification;
scan the barcode of each of the ICs to select a plurality of ICs each having a respective barcode in the set of barcodes; and
segregate the plurality of ICs from the ICs.

12. The system of claim 11, wherein the barcode of each IC is a 2D barcode that uniquely identifies each IC.

13. The system of claim 11, wherein the specification is associated with an entity, and wherein the at least one additional tool is configured to:
store an identifier for the entity in the database in association with the barcode of each of the plurality of ICs.

14. The system of claim 11, wherein the at least one additional tool is configured to:
store an identifier for each of the plurality of tools that handled each of the ICs in association with the barcode of each of the ICs.

15. The system of claim 11, wherein the at least one additional tool comprises a third tool configured to perform the querying and scanning.

16. The system of claim 15, wherein the third tool is further configured to perform the segregation of the plurality of ICs from the ICs.

17. The system of claim 15, wherein the at least one additional tool comprises a fourth tool configured to perform the segregation of the plurality of ICs from the ICs.

18. The system of claim 11, wherein the at least one additional tool comprises a third tool configured to perform the querying and a fourth tool configured to perform the scanning.

19. The system of claim 11, wherein the at least one tool is further configured to:
handle the plurality of ICs after segregation as a batch.

20. The system of claim 11, wherein the specification comprises at least one of a speed requirement and a temperature requirement.

* * * * *